United States Patent
Look (10) Patent No.: US 7,885,541 B2
(45) Date of Patent: Feb. 8, 2011

(54) METHOD AND APPARATUS FOR OPTICAL PERFORMANCE MONITORING

(75) Inventor: Christopher M. Look, Pleasanton, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 644 days.

(21) Appl. No.: 11/064,330

(22) Filed: Feb. 22, 2005

(65) Prior Publication Data

US 2005/0232631 A1 Oct. 20, 2005

Related U.S. Application Data

(60) Provisional application No. 60/547,272, filed on Feb. 23, 2004.

(51) Int. Cl.
*H04B 10/08* (2006.01)
(52) U.S. Cl. ............ 398/33; 398/147; 398/158; 398/159; 398/81; 398/29; 398/27; 398/45; 385/24; 385/16; 385/17; 385/18
(58) Field of Classification Search ............ 398/27, 398/33, 58, 26, 25, 29, 45, 158, 159, 147, 398/148, 177, 181, 81, 79, 83, 48, 50, 56, 398/37, 38, 30, 31, 59, 2, 7, 3, 5, 13, 17, 398/20, 34, 162, 202, 208, 209, 213, 214; 385/24, 16, 17, 18, 140
See application file for complete search history.

(56) References Cited

U.S. PATENT DOCUMENTS 6,215,565 B1 * 4/2001 Davis et al. ............ 398/27
6,586,724 B2 7/2003 Graves
6,621,625 B1 * 9/2003 Zhang et al. ............ 359/341.42
6,965,738 B2 * 11/2005 Eiselt et al. ............ 398/148

(Continued)

FOREIGN PATENT DOCUMENTS

EP 0863626 A2 9/1998

(Continued)

OTHER PUBLICATIONS

International Search Report PCT/US05/06026, published Sep. 13, 2006.

(Continued)

*Primary Examiner*—Hanh Phan
(74) *Attorney, Agent, or Firm*—Blakely, Sokoloff, Taylor & Zafman LLP (57) ABSTRACT

According to one aspect of the invention, an optical network including multiple optical network devices, or nodes, is provided. At each node, an optical performance monitor analyzes dispersion while a dispersion compensation module reduces the amount of dispersion in the signals. Information about the dispersion and the amount of compensation performed by the dispersion compensation module is generated by the optical performance monitor and stored in a memory. If the bit error rate of a particular path between nodes becomes too high, a new path is used. A monitoring computer then accesses the information about the dispersion stored in at least one node of the old path. The information allows a user to determine where along the path the greatest amount of dispersion is occurring.

22 Claims, 4 Drawing Sheets

U.S. PATENT DOCUMENTS

| | | | |
|---|---|---|---|
| 6,980,737 B1 * | 12/2005 | Anslow et al. | 398/27 |
| 7,123,833 B2 * | 10/2006 | Szczepanek et al. | 398/33 |
| 7,340,187 B2 * | 3/2008 | Takeshita | 398/209 |
| 2002/0018265 A1 * | 2/2002 | Graves | 359/128 |
| 2002/0044322 A1 | 4/2002 | Blumenthal et al. | |
| 2002/0089724 A1 * | 7/2002 | Nishimoto et al. | 359/161 |
| 2002/0141009 A1 * | 10/2002 | Yu et al. | 359/110 |
| 2003/0223760 A1 * | 12/2003 | Takahara et al. | 398/147 |
| 2004/0218919 A1 * | 11/2004 | Hunsche et al. | 398/27 |

FOREIGN PATENT DOCUMENTS

| | | |
|---|---|---|
| EP | 0863626 A3 | 12/1999 |
| EP | 1385281 A2 | 1/2004 |
| EP | 1473855 | 11/2004 |
| EP | 1385281 A3 | 11/2006 |

OTHER PUBLICATIONS

Written Opinion PCT/US05/06026, published Sep. 13, 2006.

* cited by examiner

METHOD AND APPARATUS FOR OPTICAL PERFORMANCE MONITORING

CROSS-REFERENCE TO RELATED APPLICATIONS

This application claims the benefit of U.S. Provisional Application No. 60/547,272, filed Feb. 23, 2004, which is hereby incorporated by reference.

BACKGROUND OF THE INVENTION

1). Field of the Invention

This invention relates to optical networks, and more particularly to optical network devices used in optical networks.

2). Discussion of Related Art

Optical networks consist of electrically powered optical nodes which communicate with each other primarily using optical signals. The optical signals are usually confined to optical fibers which physically interconnect the optical nodes.

The optical nodes can possess a wide range of capabilities which at a high level include optical functionality (such as optical amplification, optical switching, optical multiplexing, etc.), electrical functionality (such as power supply, node control and monitor, electrical data switching, etc.), and optoelectronic functions (such as the conversion between signals in the optical domain to the electrical domain and vice versa). In high traffic optical networks, multiple wavelengths can be combined in a single fiber. This process, called wavelength division multiplexing (WDM), allows a number of different signals to be independently transmitted across the same physical medium.

In such an optical network, for example, electrical data traffic can be processed and used to modulate a light source resulting in an optically modulated signal. This process is termed an electrical-to-optical (EO) conversion. Typically, the modulation rates in dense wavelength division multiplexing (DWDM) systems are concentrated around current telecommunication and data standards of nominal 2.5 gigabit per second (Gbps) and 10 Gbps class signals.

This signal is generated at one optical node and may be combined with one or more wavelengths onto a single fiber in a wavelength division multiplexing process. The signal can be optically amplified either on its own or as part of the wavelength division multiplex aggregate. The signal may then undergo separation via wavelength division multiplexing processes, optical switching, optical amplification/regeneration and optical combination at one or more intermediate nodes until it is terminated at its destination node. At intermediate nodes, or destination nodes, the signal is separated out and undergoes optical-to-electrical (OE) conversion and subsequent processing to recover the original data traffic and electrical format. Current technologies are such that different receivers are commonly used for 10 Gbps class signals and 2.5 Gbps class signals.

The node where the signal undergoes the EO conversion may be referred to as the "ingress" or originating node, the node where the signal undergoes the OE conversion may be referred to as the "egress" or terminating node, and the node that the signal enters and leaves an optical format may be referred to as pass-through nodes. Ingress and egress nodes may also be referred to as "access" nodes.

During transmission across an optical network, the dated traffic may be different as it leaves the network compared to when it enters the network. There are many reasons for this. During transmission, the optical signal quality is degraded such that at egress errors are made in the OE process. The degradation of the optical signal quality may take the form of noise added to the signal and/or pulse shaped distortion. Both noise and distortion can arise at multiple points along the optical transmission path. Normally, these effects are calculated and accounted for. However, both noise and distortion can change with environmental conditions and as devices age. If these changes are sufficient, the number of errors made in the OE process, also known as the number of errored bits per second, or "bit error rate" (BER), will increase and the network can become unusable. Under such conditions, it may be very difficult to determine where in the network the problem occurred.

One of the causes of signal distortion is known as chromatic dispersion. Chromatic dispersion is a property that results in different parts of the optical signal traveling at different speeds. While present to some degree in most optical components, chromatic dispersion of the fiber itself is usually of the most concern. At the far end of the fiber, the different parts of the signal add up in a way that is different from when it was launched, resulting in a distortion of the false shape relative to the shape of the starting pulse. The amount of distortion depends on the fiber type, the length of the fiber, and the characteristics of the source light. The effects of chromatic dispersion are most harmful at higher data rates.

The most commonly used way to combat the effects of chromatic dispersion is to send the signal through a device that has an equivalent amount of dispersion, but with the opposite sign. The effect of the opposite sign is to undo the distortion that was introduced as a result of the transmission through the fiber thereby compensating for the chromatic dispersion. The usual device used to accomplish this compensation is known as a dispersion compensating fiber. The length of the dispersion compensating fiber determines the amount of dispersion for which it compensates and is typically selected to be matched for a particular fiber length. Such a particular fiber device is called a "Dispersion Compensating Fiber (DCF)" module.

Recently, other devices have entered the market to solve the same problem. One such device is a tunable dispersion compensation module (TDCM), which has a number of advantages, the most important being that because it is tunable, one device can be used for a wide range of fiber lengths. However, it is still difficult to determine how much dispersion needs to be compensated for and to confirm that the device has been set properly. If the device has not been set properly, or degrades over time, the optical signal will be significantly distorted.

SUMMARY OF THE INVENTION

The invention provides an optical network including multiple optical network devices, or nodes. At each node, an optical performance monitor analyzes dispersion while a dispersion compensation module reduces the amount of dispersion in the signals. Information about the dispersion and the amount of compensation performed by the dispersion compensation module is generated by the optical performance monitor and stored in a memory. If the bit error rate of a particular path between nodes becomes too high, a new path is used. A monitoring computer then accesses the information about the dispersion stored in at least one node of the old path. The information allows a user to determine where along the path the greatest amount of dispersion is occurring.

The invention also provides a means to monitor the quality of the optical signal at each optical node in an all-optical network. Information is gathered relating to the signal strength, amount of noise present, and the amount of distortion present in the signal. This information is summarized and stored for each wavelength entering and leaving an optical node. Off-line analysis, which is performed by a processor at some time after the information has been acquired, can be used to correlate information gathered at different optical nodes along the signal path and at different times. This information can be then used to identify where the signal is being degraded and allow the problem to be fixed before it becomes severe enough to result in an acceptable bit error rate.

The invention further provides a means to set and confirm the correct operation of a tunable dispersion compensation module.

BRIEF DESCRIPTION OF THE DRAWINGS

The invention is described by way of example with reference to the accompanying drawings, wherein.

DETAILED DESCRIPTION OF THE INVENTION

In the following description, numerous specific details are set forth. However, it is understood that embodiments of the invention may be practiced without these specific details. In other instances, well-known circuits, software sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as necessarily being synonymous with each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "connected" and "coupled" may also mean that two or more elements are not in direct contact with each other, but yet still co-operate or interact with each other.

Figure 1:
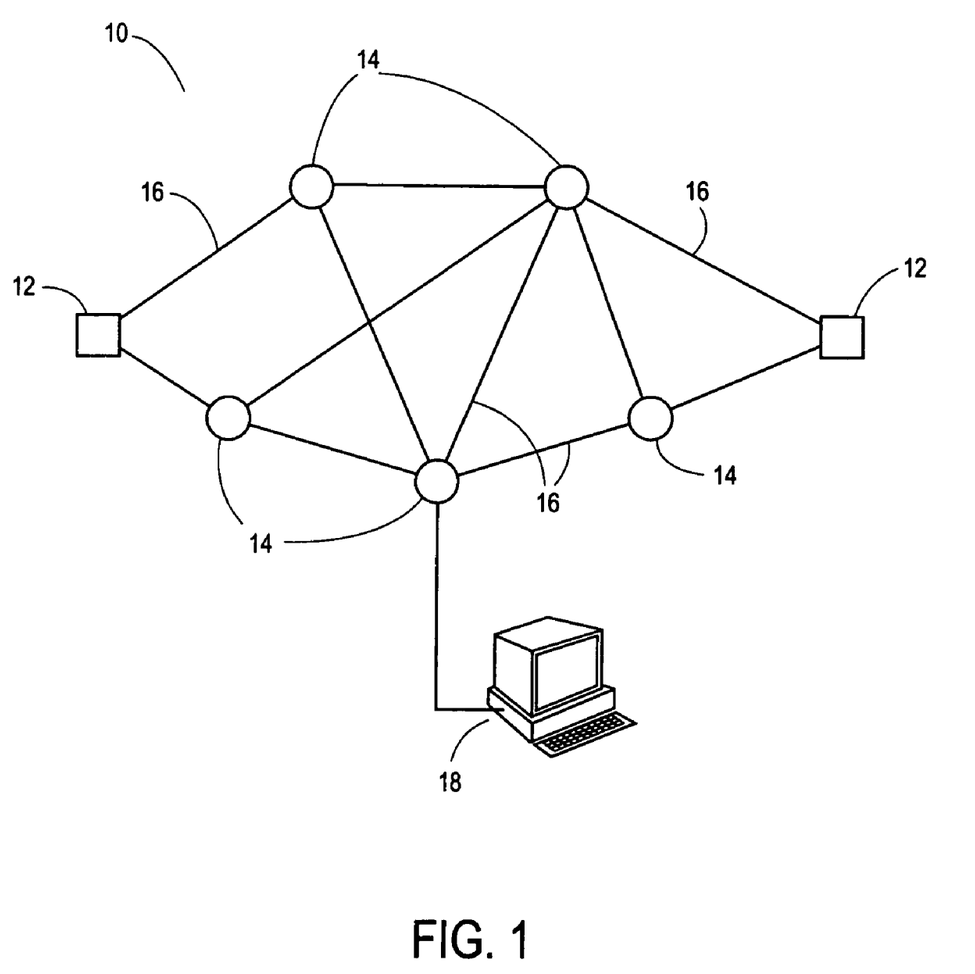
FIG. 1 is a schematic of an optical network, including multiple nodes.
Figure 2:
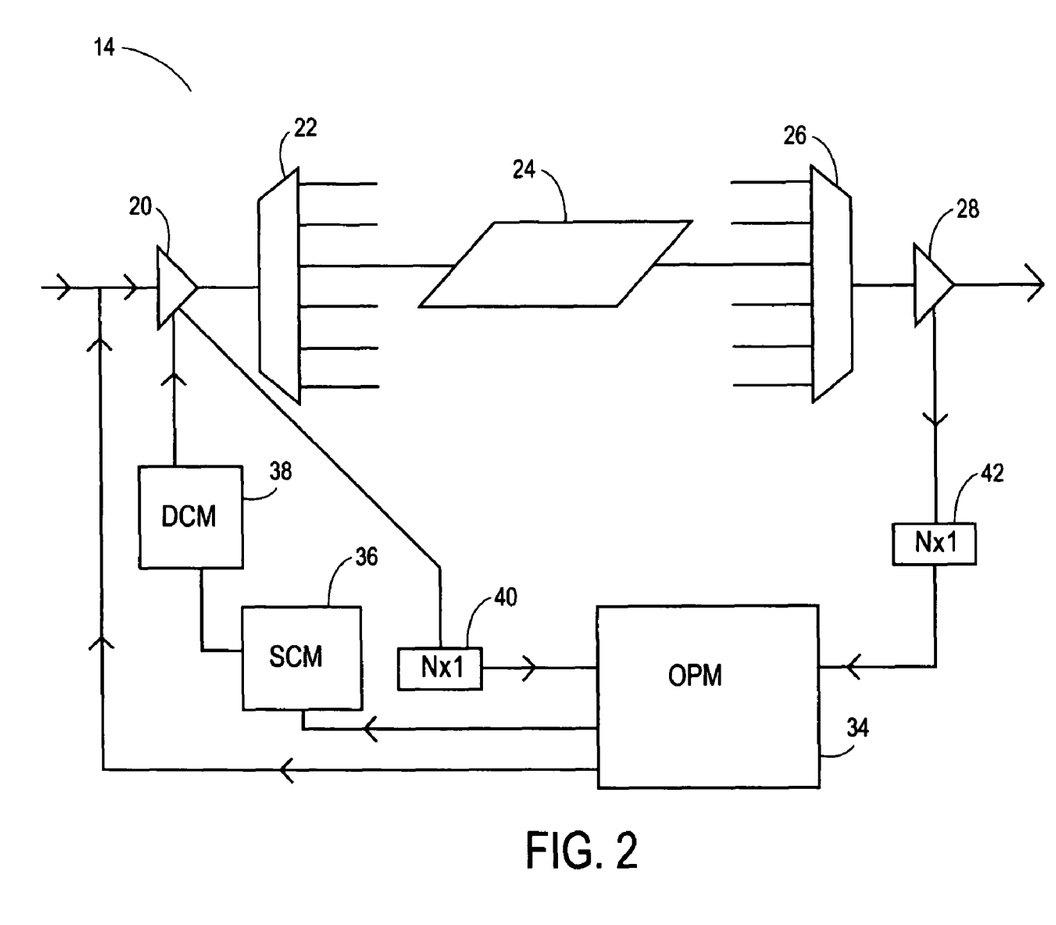
FIG. 2 is a schematic of an optical shelf within one of the nodes of the optical network in FIG. 1, including an Optical Performance Monitor.
Figure 3:
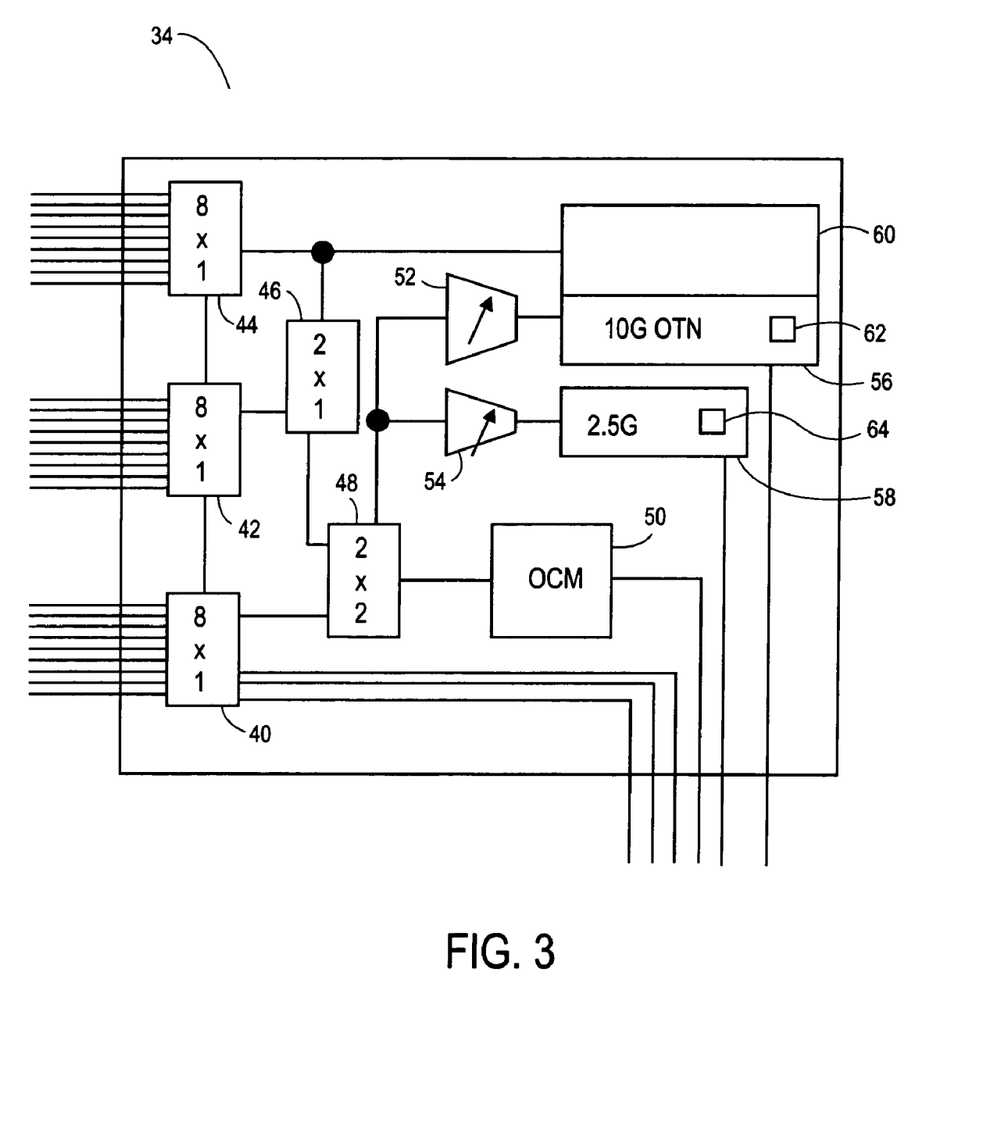
FIG. 3 is a schematic of the Optical Performance Monitor in FIG. 2.

FIG. 1 through FIG. 3 illustrate an optical network according to an embodiment of the invention. The optical network includes ingress, or access nodes, pass-through nodes, and egress nodes interconnected by fiber-optic lines and a monitoring computer connected to at least one of the nodes. Optical signals enter and exit the network at the access nodes. As the optical signals pass through the fiber-optic lines and the various nodes, the signals become degraded by dispersion and noise. At each node, an optical performance monitor analyzes the degradation of the optical signal.

Certain of the signal degradation effects are attempted to be offset through the use of Dispersion Compensation Modules (DCMs). The DCM reduces the net amount of dispersion in the signals. Information about the dispersion for each link and the amount of compensation performed by the DCM for each link is stored in a memory. This information is used by optical routing software to ensure that each path will have sufficient quality (low noise and low net chromatic dispersion) to achieve the target "bit error rate" (BER). An Optical Performance Monitor (OPM) at each node along the path is able to measure the signal quality once the path has been established. This information is stored in memory. This information can be analyzed and correlated at each node along the path as well as over time.

If the BER turns out to be too high in practice, the path can be rerouted to try to restore the target BER. The monitoring computer then analyze the signal noise and distortion over time and along the path. The information can be used to identify where and when the signal began to be degraded and hence be able to identify degraded or marginal equipment that otherwise would be very difficult to otherwise resolve.

Alternative approaches would be to take the equipment out of service and use expensive diagnostic equipment and expert technicians to try to isolate the problem. Hence, the OPM has the potential to save the network operators significant time and effort to maintain their network and improve customer satisfaction.

FIG. 1 illustrates an optical network 10 according to an embodiment of the invention. The optical network 10 has multiple nodes, including two access nodes 12 and five pass-through nodes 14, and fiber optic lines 16 interconnecting the nodes, and a monitoring computer 18 connected to one of the nodes. The access nodes 12 include the capability to convert electrical signals into dense wavelength division multiplexing (DWDM) optical signals for transmission through the optical network. The pass-through nodes have the capability to optically switch each DWDM signal from one optical fiber to another. Hence the signal can be generated at an ingress node and delivered to an egress node while remaining as an optical signal at all the intermediate pass-through nodes. Although the optical network 10 is illustrated as having seven nodes, it should be understood that the network 10 may have less, or considerably more, nodes with each node being connected to other nodes through fiber-optic lines, or optical fibers, 16.

Additionally, only one monitoring computer 18 is illustrated, each node may have a similar computer connected thereto. The monitoring computer 18 is in the form of a computer having memory for storing a set of instructions and a processor connected to the memory for executing the instructions, as is commonly understood in the art.

FIG. 2 illustrates an optical shelf (hereinafter referred to a "node") within one of the pass-through nodes 14 according to an embodiment of the invention. The node 14 includes an optical pre-amp 20, an optical DWDM demultiplexer 22, an optical switch 24, an optical multiplexer 26, an optical booster 28, an assembly of optical switches 30 and 32 (e.g., a first N×1 optical switch 30 and a second N×1 optical switch 32), an Optical Performance Monitor, or module 34, a Shelf Controller Module (SCM), or a micro-controller 36, and a tunable Dispersion Compensation Module 38.

Although not illustrated, it should be understood that the node 14 may contain multiple optical shelves, and the OPM 34 may be shared by the optical shelves through multiple ports, where each port is associated with an optical fiber.

There are optical splitter devices which take incoming light on an input port and direct it to two or more output ports where the ratio of the powers in the output ports can be set to a known value. In specific, a splitter will be used to describe an optical device with 1 input port and 2 output ports where one of the output ports is known as a 'through port' and the other is known as a 'tap port'. The ratio of light coupled into the 'tap' port relative to the 'through' port is a small number, meaning that only a small amount of the input power is taken and delivered to the tap port. The signal in the tap port contains all the information as the through port, just at a lower power level. Hence it can be used to unobtrusively monitor the through signal. The optical splitters are located in convenient locations within the optical shelf where it can sample the signal at each ingress to the node and at each egress. If there are N network ports and an optical splitter at each ingress and each egress to the node, there will be thus be N ingress optical splitters and egress N optical splitters. The optical splitters may be physically incorporated inside one of the optical elements previously identified. The N×1 optical switches 30 and 32 may be connected to the N taps, where one N×1 optical switch is connected to ingress taps and one N×1 optical switch is connected to egress taps.

The micro-controller 36 includes a microprocessor and a non-volatile storage. The non-volatile memory includes, among other items, program storage, a configuration database, and statistical storage.

A fiber optic line 16, which interconnects the pass-through node 14 illustrated to another node, is connected to an input of the pre-amp 20. An output of the pre-amp 20 is connected to the demultiplexer 22. The pre-amp 20 is also connected to the first N×1 switch 30, the DCM 38, and the OPM 34. As illustrated in FIG. 2, the demultiplexer 22 and the multiplexer 26 are interconnected by the optical switch 24.

Although the node 14 is illustrated as having only one demultiplexer 22 and multiplexer 26, it should be understood that the node 14 may actually have multiple pairs of demultiplexers 22 and multiplexers 26, such as one pair for each fiber-optic line 16 passing through the node 14. Additionally, although the optical switch 24 is illustrated as including only one "switch fabric," the optical switch 24 may include multiple switch fabrics, such as one for each wavelength into which the optical signal is broken. Furthermore, although the node 14 is illustrated as having only one set of the above components, it should be understood that the node may actually contain multiple sets of these components, such one for each fiber-optic line 16 passing though the node 14.

Referring again to FIG. 2, an output of the multiplexer 26 is connected to an input of the optical booster 28. A fiber optic line 16 is connected to the output of the booster 28, and referring back to FIG. 1, interconnects the node 14 illustrated in FIG. 2 with another node in the network 10.

As shown in FIG. 2, the booster 28 is also connected to the second N×1 switch 32. The OPM 34 is connected to the first N×1 switch 30, the second N×1 switch 32, the micro-controller 36, and the optical pre-amp 20. The micro-controller 36 interconnects the OPM 34 and the DCM 38. Both the first 30 and second 32 N×1 switches are connected to inputs of the OPM 34. The pre-amp 20 and the micro-controller 36 are connected to outputs of the OPM 34. An output of the micro-controller 36 is connected to an input of the DCM 38.

FIG. 3 illustrates the OPM 34. The OPM 34 includes an assembly of optical switches 40, 42, 44, 46, and 48 (e.g., a first 8×1 switch 40, a second 8×1 switch 42, a third 8×1 switch 44, a 2×1 switch 46, a 2×2 switch 48), an Optical Channel Module (OCM) 50, a first tunable filter 52, a second tunable filter 54, optical receivers 56 and 58, and a tunable optical transmitter 60.

The optical receivers 56 and 58 may include a 10 Gbps class receiver and a 2.5 Gbps class receiver, such as a 10 Gbps Optical Transport Network (10G OTN) receiver 56 and a 2.5 Gbps (2.5 G) receiver 58.

The 10 G OTN receiver 56 includes an Electronic Dispersion Chip (EDC) 62, and the 2.5 G receiver includes a Clock and Data Recovery (CDR) chip 64, or integrated circuit. As is commonly understood in the art, an EDC may be understood to be a particular type of CDR chip.

Referring to both FIGS. 2 and 3, the third 8×1 switch 44 is connected to the pre-amp 20.

Within the OPM 34, the first 8×1 switch 40 is connected to the second 8×1 switch 42 and the 2×2 switch 48. The second 8×1 switch 42 is also connected to the third 8×1 switch 44 and the 2×1 switch 46. The third 8×1 switch 44 is also connected to the tunable transmitter 60 and the 2×1 switch 46.

The 2×1 switch 46 is also connected to the 2×2 switch 48, which in turn, is connected to the OCM 50. The 2×2 switch 48 is also connected to the first 52 and second 54 tunable filters which each feed into one of the 10 G OTN receiver 56 and the 2.5 G receiver 58, respectively.

Referring again to both FIGS. 2 and 3, the first 8×1 switch 40, the OCM 50, the 2.5 G receiver 58, and the 10 G OTN receiver 56 are all connected to the micro-controller 36.

In use, referring to FIG. 1, optical pulses, including digital signals, enter the optical network 10 at a first access node 12. At the first access node 12, signals from various electronic components, such as computers, are converted from electrical signals representing digital bits (ones and zeros) into optical signals representing the same information. The optical signals are sent though the network 10 as the pass-through nodes 14 transmit the signals between the access nodes 12 and create particular paths between one access node 12 and another.

As the signal passes through the fiber-optic lines 16 over what may be hundreds of miles, the signal undergoes dispersion and is distorted.

Referring to FIG. 2, the signal enters the node 14 through the pre-amp 20 and the fiber-optic line 16 connected thereto. The optical pre-amp 20 compensates for fiber loss between the two nodes but does not compensate for the amount of dispersion that the signal has undergone. The optical signal is tapped at the ingress point so that the signal distortion can be analyzed. The tapped signal is sent to the OPM 34 for analysis, as illustrated by the connection between the optical pre-amp 20 and the OPM 34 through the first N×1 switch 30.

The signal is then sent to the demultiplexer 22, which breaks apart the optical signal into individual wavelengths as illustrated by the multiple output lines connected to the demultiplexer 22. Each output line corresponds to an individual wavelength. Although only six output lines are illustrated, it should be understood, that the demultiplexer 22 may divide the optical signal into 40 individual wavelengths.

As is commonly understood in the art, the optical switch 24 transfers signals on particular wavelengths from one fiber-optic line 16 to another fiber-optic line (not illustrated), depending on the desired destination of the signals. Once the individual wavelengths are "switched" to the appropriate optical fiber (i.e., the egress optical fiber port appropriate for their next hop), they are fed into the multiplexer 26 which combines the individual wavelengths into a single optical signal. Before the optical signal is sent into the demultiplexer 22 and again after it leaves the multiplexer 26, a portion of the optical signal is sent to the OPM 34 through the first 30 and second 32 N×1 switches.

The N×1 switches 30 and 32 control which port the OPM 34 is monitoring. Within the OPM 34, the 8×1 switches 40, 42, and 44 control which particular fiber-optic line the OPM 34 is monitoring, and the 2×2 switch 48 controls where within the node 14 the OPM 34 is monitoring the optical signal, either at the pre-amp stage 20 or the booster 28 stage, as the first 8×1 switch 40 is connected to the pre-amp 20 and the second 8×1 switch is connected to the booster 28.

In one mode of operation, the receivers 56 and 58 monitor the optical signal at the pre-amp 20 while the OCM 50 monitors the optical signal at the booster 28.

The first tunable filter 52 controls which particular wavelength is analyzed by the EDC 62 within the 10 G OTN receiver 56, and the second tunable filter 54 controls which particular wavelength is analyzed by the CDR 64 within the 2.5 G receiver 58.

The OPM 34, particularly the EDC 62 and the CDR 64, characterize the optical signal by performing multiple functions to maximize the performance of the node 14. The OPM 34 provides source and detection mechanisms to participate in Link Management Protocol (LMP) processes for discovery and thought isolation. The OPM 34 also provides emergency diagnostic capabilities, such as the ability to absolutely confirm the identity of specific optical signals, the ability to confirm the presence of signals on incoming or outgoing fibers, and the ability to determine the relative "health" of a signal transiting the node. The OPM 34 also provides a source of DWDM optical signals to allow a proper Variable Optical Attenuator (VOA) setting. The OPM 34 further gathers long term information relating to the health of the node 14, including confirmation of the laser center of frequency, confirmation of the filter center of frequency, and confirmation that the tunable dispersion compensation is set appropriately.

In general, the EDC 62 and/or the CDR 64, evaluate the incoming optical signal stream and decide whether particular pulses are ones or zeros (1s or 0s). In making this assignment, errors can be made (e.g. a pulse being assigned as a '0' when it is really a '1'. The particular EDC and CDR devices selected for this application have the ability to determine whether the number of errors can be increased or decreased by changing the decision point. Changing the decision point in one dimension provides information concerning primarily noise in the signal and in the other dimension, provides information concerning primarily signal shape. EDC circuitry is intended to compensate for signal distortion prior to determination of a 1 or 0. Information relating to the amount and type of correction made to the signal before the 0/1 decision is made is stored in registers in the chip. This information can be accessed to provide information concerning the shape of the signal prior to optimization by the EDC function. Thus either of the two techniques (EDC or CDR amplitude/phase variation) can be used to discern the pulse shape.

A signal is sent to the micro-controller 36, which tunes the DCM 38 to optimize the performance of the node 14 and minimize the dispersion of the optical signal.

The 2.5 Gbps class receiver 58 and the 10 Gbps class receiver 56 look at a tapped version of the signal, not the signal intended for the end user (the "though signal") so the analysis can be performed without causing any impairment to the through signal. Thus, the receivers "silently" perform an optical/electrical conversion on the optical channels without impacting service. The functions that the receivers 56 and 58 provide are to inspect the header to confirm the signal origin and destination, to perform a system quality analysis on the 10 Gbps signal inferred from electronic compensation circuitry, measure power at the null between wavelength peaks, and participate as a receiver for LMP purposes.

Within the OPM 34, the OCM 50 is used primarily for the VOA function and to confirm that the right number of signals is present on the egress. The OCM 50 also determines the average power level and frequencies of signals, as well as the signal to nose ratio.

The information generated by the EDC 62, CDR 64, and OCM 50 is sent to the micro-controller 36 where it is stored in the memory of the micro-controller 36 and used to tune the DCM 38. This information may include center frequency of source, effective center of preceding arrayed-waveguide gratings (AWGs), the amount of signal noise, the optical signal to noise ratio (OSNR), the amount of signal distortion, the BER, and the date and time. This information is stored for long term, such as a period of several months or more, for analysis of the optical network 10.

The 2×1 switch 46 is used to allow the module to perform self-test and self-calibration as it controls whether the 2.5 G receiver 58, the 10 G OTN receiver 56, and the OCM 50 are monitoring either the optical signal at the optical pre-amp 20 or the tunable optical transmitter 60.

The tunable optical transmitter 60 provides a source of known optical signals that can be injected through the node 14 beginning at the optical pre-amp 20 stage. Thus the tunable transmitter 60 allows for internal diagnostics and fault isolation as well as serving as a light source for LMP purposes. Optical signals from the tunable transmitter 60 can also be sent into the optical network 10 to pass to other nodes for other diagnostic tests.

In another mode of operation, the 2×2 switch 48 changes where in the node 14 the OPM 34 is monitoring the optical signal. In this mode of operation, the EDC 62, and/or the CDR 64, monitors the optical signal at the booster 28 while the OCM 50 monitors the optical signal at the optical pre-amp 20.

In the event that the BER along a first path between the first and second access nodes 12 becomes too high, a different path, incorporating different nodes within the network is used. While the original path is not being used, the monitoring computer 18 accesses the memory within the micro-controller 36 in each node of the old path. The information about the optical signal that was generated by the EDC 62, CDR 64, and OCM 50 within each node is sent to the monitoring computer 18. At the monitoring computer 18, either the user or an expert-based software program can review and analyze stored data to determine which node or nodes are the most likely sources of the high BER (or dispersion) within the old path. The user is thus provided with a diagnostic tool for the optical network. Therefore, it should be understood that more than one node within the network may include an optical network device as the one described above.

Additionally, the tunable filters 52 and 54 may be used to determine whether any optical source, such as a laser, and any preceding filters are at their correct frequency.

Figure 4:
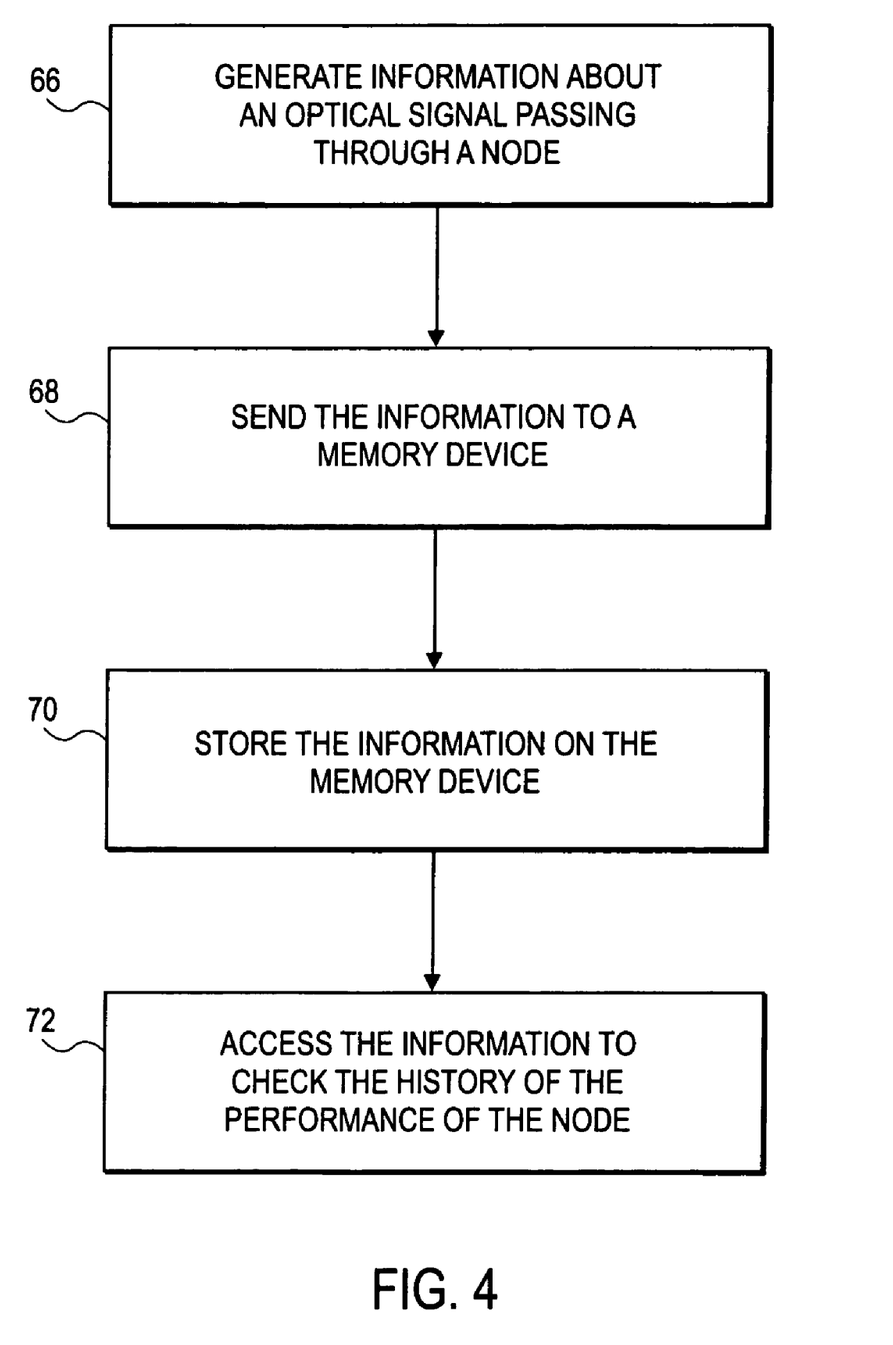
FIG. 4 is a flow chart illustrating a method for monitoring the performance of an optical network device.

FIG. 4 illustrates a method of monitoring the optical performance of an optical network device according to an embodiment of the invention. In step 66, information about an optical signal passing through a node is generated by the OPM. Next, in step 68, the information is sent to a memory device. Then, in step 70, the information is stored on the memory device. In step 72, the information is then accessed to check the history of the performance of the node.

One advantage is that because information about the optical signal at each node is available, a user can determine which node, or nodes, is most likely the source of the high BER. Therefore, improperly working nodes can be identified more easily and quickly, resulting in more efficient repairs to the optical network.

Other embodiments may also be included in access nodes. A pre-set DCMs may be used in place of the tunable DCM. The monitoring computer is not necessary. Each node of the network may have a monitoring computer incorporated therein, or there may be only one monitoring computer connected to several different nodes. There may be only one receiver having only one of an EDC, CDR, or other similar integrated circuit within the OPM. Each nodes of the network may include both optical shelves and well as OEO shelves. The information within the memory devices may be accessed at any time to check the "health" of the respective node. Other types of non-OTN optical receivers could be used, such as Synchronous Optical NETworks (SONET) receivers. The switches within the nodes and the OPM may be combined and integrated into fewer physical devices.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An optical network device comprising:
    a plurality of optical lines to each carry a multiplexed optical signal;
    a first optical switch connected to the plurality of optical lines to select one of the plurality of optical lines for information generation related to dispersion characteristics of the selected optical line;
    a receiver connected to the first optical switch to generate dispersion information about the multiplexed optical signal carried on the selected optical line by performing optical/electrical conversion on a selected wavelength of the multiplexed optical signal, wherein the dispersion information includes bit error rate information about the multiplexed optical signal; and
    a memory device connected to the receiver to store the dispersion information about each of the plurality of multiplexed optical signals, wherein the memory device uses the stored dispersion information to reduce the amount of dispersion for each of the plurality of multiplexed optical signals.

2. The optical network device of claim 1, wherein the plurality of multiplexed optical signals include a plurality of channels, each channel corresponding to a particular wavelength and further comprising a demultiplexer connected to the at least one of the plurality of fiber-optic lines to separate the plurality of multiplexed optical signals into the plurality of channels.

3. The optical network device of claim 2, further comprising an optical switch connected to the demultiplexer to switch a channel from one of the fiber-optic lines to another fiber-optic line.

4. The optical network device of claim 2, further comprising a multiplexer connected to the optical switch to re-combine the plurality of channels into one of the plurality of multiplexed optical signals.

5. The optical network device of claim 1, wherein the receiver is at least one of a 2.5G receiver and a 10G Optical Transport Network receiver.

6. The optical network device of claim 1, wherein the receiver comprises at least one of an Electronic Dispersion Chip and a Clock and Data Recovery chip.

7. The optical network device of claim 1, further comprising at least one dispersion compensation module connected to at least one of the plurality of fiber-optic lines to reduce dispersion in at least one of the plurality of multiplexed optical signals.

8. The optical network device of claim 7, further comprising a micro-controller connected to the receiver and the dispersion compensation module.

9. An optical network device comprising:
    a plurality of optical fibers to each carry a multiplexed optical signal, the plurality of multiplexed optical signals each including a plurality channels, each channel corresponding to a particular wavelength;
    a demultiplexer connected to one of the plurality of optical fibers to separate the multiplexed optical signal into the plurality of channels;
    a first optical switch connected to the demultiplexer;
    a multiplexer connected to the optical switch to combine the plurality of channels into the multiplexed optical signal;
    a second optical switch connected to the plurality of optical fibers to select one of the plurality of optical fibers for information generation related to the dispersion characteristics of the multiplexed optical signal carried on the selected optical line;
    a receiver connected to second optical switch to generate dispersion information about the selected multiplexed optical signal by performing optical/electrical conversion on a selected channel of the selected multiplexed optical signal, wherein the dispersion information includes bit error rate information about the multiplexed optical signal; and
    a memory device connected to the receiver to store the dispersion information about each of the plurality of optical fibers, wherein the memory device uses the stored dispersion information to reduce the amount of dispersion in the each of the optical fibers.

10. The optical network device of claim 9, wherein the receiver comprises at least one of an Electronic Dispersion Chip and a Clock and Data Recovery chip.

11. An optical network comprising:
    a plurality of nodes, including access and pass-through nodes, the access nodes to add and drop optical signals from the optical network, at least one of the nodes comprising:
        a plurality of optical cables to each carry a multiplexed optical signal;
        a first optical switch connected to the plurality of optical cables to select one of the plurality of multiplexed optical signals for information generation related to the dispersion characteristics of the selected multiplexed optical signal;
        a receiver connected to the first optical switch to generate dispersion information about the selected multiplexed optical signal by performing optical/electrical conversion on a selected wavelength of the selected multiplexed optical signal, wherein the dispersion information includes bit error rate information about the multiplexed optical signal; and
        a memory device connected to the receiver to store the dispersion information about each of the multiplexed optical signals, wherein the memory device uses the stored dispersion information to reduce the amount of dispersion in each of the plurality of multiplexed optical signals,
    wherein the plurality of optical cables interconnect with others of the plurality of nodes forming a plurality of paths between access nodes, the pass-through nodes to switch the multiplexed optical signals between a first path and a second path.

12. The optical network of claim 11, further comprising a monitoring computer connected to at least one of the nodes to access the dispersion information about each of the plurality of multiplexed optical signals.

13. The optical network of claim 11, wherein each of the plurality of multiplexed optical signals includes a plurality of channels, each channel corresponding to a particular wavelength and the at least one of the node further comprises a demultiplexer connected to the optical cable to separate the multiplexed optical signal into the plurality of channels.

14. The optical network of claim 13, wherein the at least one of the nodes further comprises an optical switch connected to the demultiplexer.

15. The optical network of claim 13, wherein the at least one of the nodes further comprises a multiplexer connected to the optical switch to re-combine the plurality of channels into at least one of the plurality of multiplexed optical signals.

16. The optical network of claim 11, wherein the receiver is at least one of a 2.5G receiver and a 10G Optical Transport Network receiver.

17. The optical network of claim 11, wherein the receiver comprises at least one of an Electronic Dispersion Chip and a Clock and Data Recovery chip.

18. The optical network of claim 11, the at least one of the nodes further comprises at least one dispersion compensation module connected to one of the plurality of optical cables to reduce dispersion in each of the plurality of multiplexed optical signals.

19. The optical network of claim 18, wherein the at least one of the nodes further comprises a micro-controller connected to the receiver and the dispersion compensation module.

20. A method comprising:
splitting each of a plurality of multiplexed optical signals passing through an optical device into a transmitted multiplexed optical signal and a monitored multiplexed optical signal;
switching the plurality of monitored multiplexed optical signals to a receiver;
generating dispersion information with the receiver about the plurality of monitored multiplexed optical signals by performing optical/electrical conversion on a selected wavelength of each of the plurality of monitored multiplexed optical signals, wherein the dispersion information includes bit error rate information about the multiplexed optical signal;
storing the dispersion information on a memory device; and
reducing the amount of dispersion in the plurality of transmitted multiplexed optical signals based on the generated dispersion information.

21. The method of claim 20, further comprising accessing the dispersion information to check the history of the performance of the optical network device.

22. The method of claim 20, wherein the receiver comprises at least one of an Electronic Dispersion Chip and Clock and Data Recovery chip.

* * * * *